June 24, 1969          R. S. HOLDEN          3,451,113
T-FITTINGS AND METHOD OF MAKING SAME
Filed July 27, 1967                    Sheet 1 of 2

INVENTOR.
R. STUART HOLDEN
BY
Curtis, Morris & Safford
ATTORNEYS

INVENTOR.
R. STUART HOLDEN

BY

ATTORNEYS

United States Patent Office 3,451,113
Patented June 24, 1969

3,451,113
T-FITTINGS AND METHOD OF MAKING SAME
Robert Stuart Holden, 24 Coleman Road,
Glastonbury, Conn. 06033
Filed July 27, 1967, Ser. No. 656,434
Int. Cl. F16l 41/02
U.S. Cl. 29—157                              2 Claims

ABSTRACT OF THE DISCLOSURE

A unitary branched T-fitting is formed from a length of tubular metal stock by confining a brass tube confined within a set of dies having a transverse cavity where it is desired to form the T-connection. An elastomeric core is introduced into the tube and pressure is exerted upon it to force the tube wall material to flow and bulge outwardly into the cavity in the dies. A hemispherical bulge is thus formed, and an appropriately shaped opening is cut in the bulge. A ball is pulled through the opening to expand and pull the bulge into the desired cylindrical T-connection or integral with the original tube.

---

The present invention relates to sheet metal pipe fittings and more particularly to T-fittings, and to making such fittings from a single piece of tube or tubular stock.

Objects of the present invention are to provide a simple, economical method for manufacturing branched T-fittings and T-fittings so produced. Another object is to provide a method for manufacturing such fittings wherein the branched extension is drawn to a length sufficient to add a threaded ring member without requiring the addition of an auxiliary tubular extension. A further object of the present invention is to provide a method of manufacturing branched fittings by an extrusion or drawing process wherein after the branched projection has been extruded or drawn no further finishing operation is required.

Still another object is to provide an improved method for drawing a unitary branched fitting from a tubular member, while avoiding the disadvantages of the prior art.

In the ilustrative embodiment of the invention, a section of thin-walled metal tube is placed within a die in which the tube is snugly received. The die has a transverse cylindrical cavity at the side of the tube which is of the size and contour of the T-connection which is to be formed on the T-fitting. A deformable core element is inserted within the tube section, and then is compressed so as to cause the tube to expand outwardly against the confines of the die. The wall portion of the tube adjacent the cavity in the dies, being unconfined, bulges outwardly into the cavity forming a hemispherical bulge. The tube is then annealed to remove internal stresses in the material due to the cold working, and the procedure is repeated to create a still larger hemispherical bulge. A circular opening is then cut in the center of the bulge, and a ball is pulled outwardly through the opening to draw the bulged material outward, forming a cylindrical unitary branched T-extension having a flat end portion.

Figure 1:
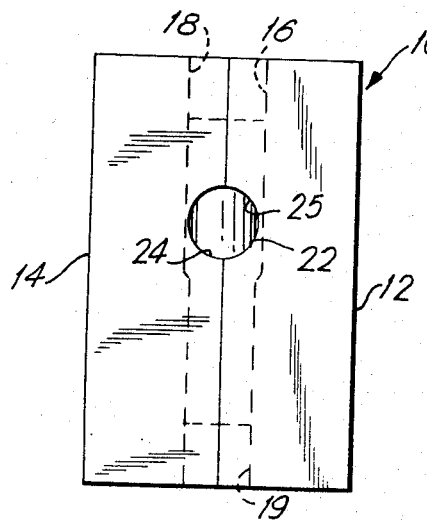
FIGURE 1 is an end view showing the die, and a tube section enclosed therein.
Figure 2:
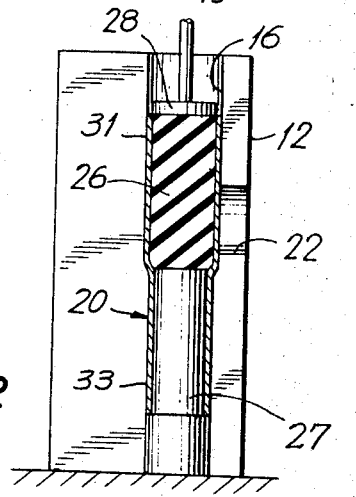
FIGURE 2 is a view, partly in section, along the mating face of one die, showing the tube in section and the core positioned for the application of compression force.

Referring now to the drawings, there is shown generally at 10 a pair of mating dies 12 and 14 having in their abutting faces semi-cylindrical channels 16 and 18, respectively. The lower portions of the channels are of reduced radius, so that when the dies are closed they provide a cylindrical cavity 19 having sections of different diameters, with the lesser diameter section being at the bottom. The dies also have transverse semicylindrical channels 22 and 24, respectively, which form a T-cavity 25 connected to the larger diameter section of cavity 19 and having its axis perpendicular to and intersecting the axis of cavity 19.

Figure 3:
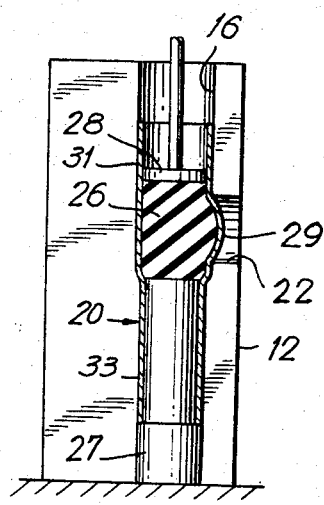
FIGURE 3 is a view similar to FIGURE 2 showing the tube and core after the first application of a force on the core.

To form a branched T-fitting tube, a cylindrical metal tube 20, having an upper tube portion 31 and a lower tube portion 33 of reduced diameter, is positioned within the cylindrical cavity 10, and the die is closed so that the tube is surrounded by the walls of the die, except at the T-cavity 25. A metal anvil plug 27 is positioned in the bottom of the die and the reduced lower end of the tube, so as to provide a cylindrical compression cavity in the top portion 31 of the tube down to the top of the tube portion 33. A cylindrical elastomeric core 26 of urethane rubber then is inserted in the compression cavity. A piston 28 which snugly fits the cavity in the top of the tube is then pressed downwardly against core 26. Core 26 is a deformable solid which acts as a liquid to transmit the compression forces in all directions so that it pushes radially outwardly on the tube walls. The tube walls are confined and supported by the die walls, except in the T-cavity 25. The compression forces are of such magnitude as to extrude or draw the tube wall outwardly into T-cavity 25 to form a bulge 29 as shown in FIGURE 3. The cold working of the metal produces work hardening, and after an initial bulging step piston 28 is withdrawn, the die is opened, and the tube is removed. Core 26 has the memory characteristic that it returns to its original cylindrical shape when the compression forces are removed, and it is readily removed from the tube. The tube is then annealed so as to free the metal from the effects of the cold working and restore it to its "soft" condition.

Figure 4:
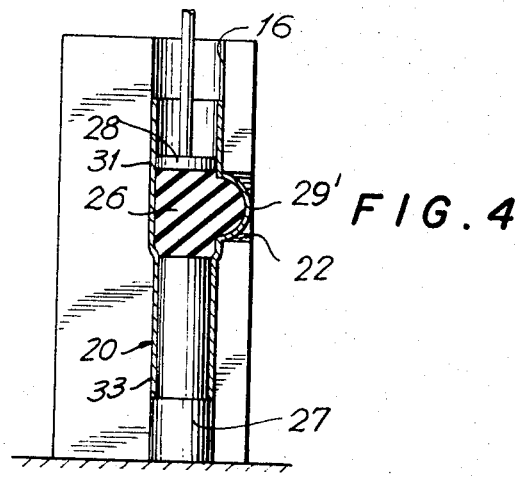
FIGURE 4 is a view similar to FIGURE 3 showing the tube and core after a second application of force to thereby create a larger bulge.

The annealed tube is replaced in the die, and the plug and core are reinserted, and the compression step is repeated. This second compression step enlarges the bulge so that it projects further into T-cavity 25, and is of the order of bulge 29' of FIGURE 4.

Figure 5:
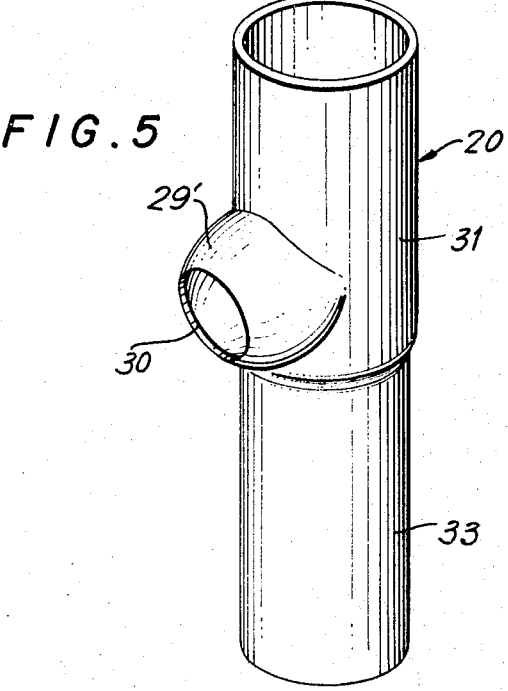
FIGURE 5 is a perspective view of the tube after it has been removed from the die and has a circular opening in its bulge.
Figure 6:
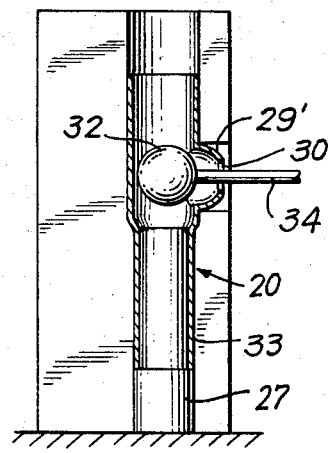
FIGURE 6 is a sectional view of the tube after it has been replaced into the die, showing the ball element before it is pulled through the opening in the bulge.
Figure 8:
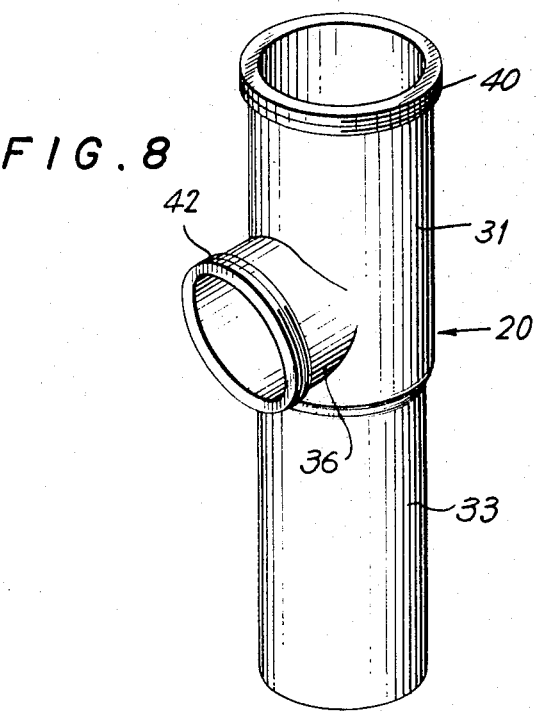
FIGURE 8 is a perspective view of the completed branching T-fitting, with the appropriate threaded collars installed on the T-fitting tube.
Figure 7:
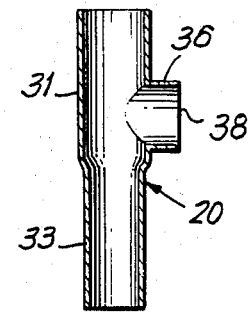
FIGURE 7 is a view showing the completed branched T-fitting tube.

The tube is then removed and annealed again, and (see FIGURE 5) a circular opening 30 is cut in the center of the bulge. The tube is then returned to the die and (see FIGURE 6) a drawing or extruding ball 32 is drawn by its stem 34 through opening 30. That drawing step expands and draws bulge 29' into a T-extension or sleeve 36 (see FIGURE 7), the axis of which is at right angles to and intersects the axis tube portion 31. The extension of the laterally projecting tube is on the order of 19 to 38 percent of the tube stock diameter as clearly indicated by FIGS. 7 and 8 of the drawings. T-extension or sleeve 36 has a flat end which is truly circular and which does not require finishing. The T-fitting is then completed (see FIGURE 8) by attaching threaded collars 40 and 42, respectively, to the top end of the tube section 31 and the end of the T-extension or sleeve 36. In this embodiment the threaded collars are attached by soldering, although they may be of the type which are slipped in place and the tube walls are expanded by a wedging action.

Tube 20 is a brass tube of the type which has been standard in producing T-fittings of this type. In the illustrative embodiment, the tube is described as having sections of different diameters and of a size to be snugly received within the die. However, the tube 20 may be of the uniform diameter of tube section 33, and the first step may be to expand the upper section in the die which does not have the T-cavity 25. Also, if the tube portion 31 is slightly smaller than contemplated so that there is a void between the outer tube wall and the die walls, the initial compression step expands the tube into the void. Hence, the completed T-fitting has very precise dimensions throughout the upper portion which carries the threaded ring 40 and the T-sleeve or T-extension which carries the threaded ring 42.

The completed T-fitting tube has metal flow lines extending from the main tube substantially parallel to the axis of the T-connection 36. The interconnecting portion between the main tube and the T-connection is in the nature of a channel having the general contour of the line of intersection between the two cylindrical portions. The walls of the T-extension or sleeve 36 are thinner than those of the main tube. However, the work hardening and the contour of the interconnecting portion produce a structure which is sturdy and which is attached to the main tube with sufficient rigidity to resist damage during normal usage.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention.

What is claimed is:

1. A method for forming a fitting having a laterally projecting T-connection comprising confining a section of tubular metal stock material within a die having a cylindrical cavity therein to snugly receive the section of tubular stock material, said die including a branched cavity within said die intersecting said cylindrical cavity and defining an unconfined wall area spaced from the ends of said tubular stock to define the area where the T-connection is to be formed, inserting an elastomeric core member into said tubular stock such that the core member is positioned within the tubular stock material at the unconfined area, exerting compressive force upon said core member of sufficient magnitude to cause it to cold flow thereby to exert radially outward expansion forces on the wall of said tubular stock member in contact with said elastomeric core member and adjacent to said unconfined area so as to cause said material to tend to cold flow with said core member thereby causing bulging and thinning of the material thereby to form a bulge radially outwardly by drawing material substantially only from the stock in contact with said core member and adjacent said unconfined area, cutting an opening of predetermined size and shape in said bulged portion, annealing said bulged tubular stock material thereby to relieve internal stresses in the material, inserting a forming tool into said tubular stock material and pulling said tool radially outwardly through the opening in said bulged area thereby causing drawing and further thinning of the bulged material to form a laterally projecting T-extension extending outwardly a distance of from 19% to 38% of the initial tube stock diameter and having a flat circular end which does not require further finishing operations.

2. A method as defined in claim 1 including the step of attaching an externally threaded ring to the flat circular end of the T-extension.

References Cited

UNITED STATES PATENTS

| 977,740 | 12/1910 | Higgins | 285—156 |
| 2,238,037 | 4/1941 | Cornell. | |
| 2,243,809 | 5/1941 | Wendel. | |
| 2,290,965 | 7/1942 | Hodapp et al. | |
| 2,735,389 | 2/1956 | Wurzburger. | |
| 2,762,326 | 9/1956 | Burkhart. | |
| 2,975,510 | 3/1961 | Heuss et al. | |

CARL W. TOMLIN, *Primary Examiner.*

WAYNE L. SHEDD, *Assistant Examiner.*

U.S. Cl. X.R.

285—156